T. W. ROACH.
SAW TENSIONING AND STRAIGHTENING MACHINE.
APPLICATION FILED JUNE 18, 1913.
1,096,756.
Patented May 12, 1914.
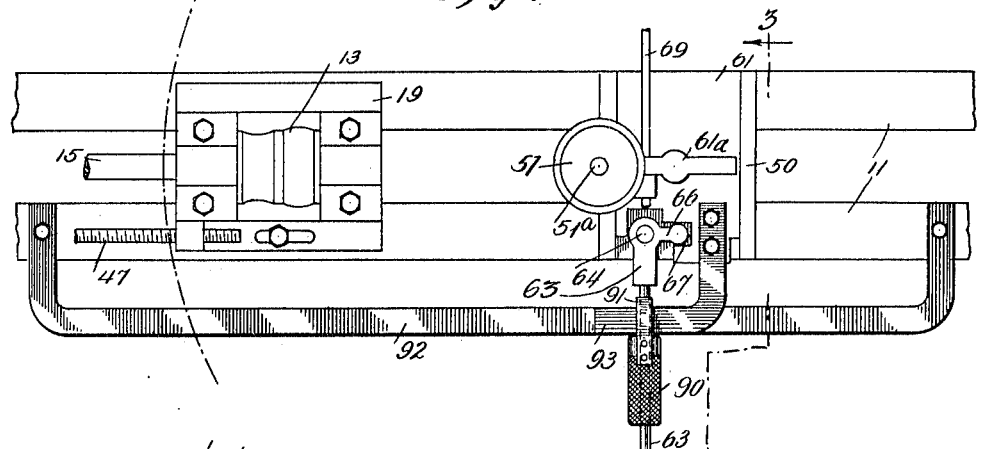
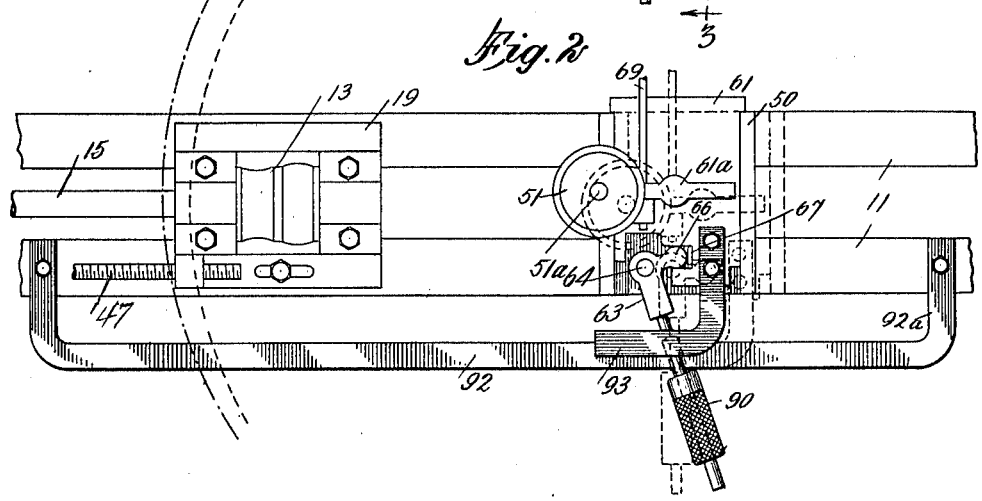
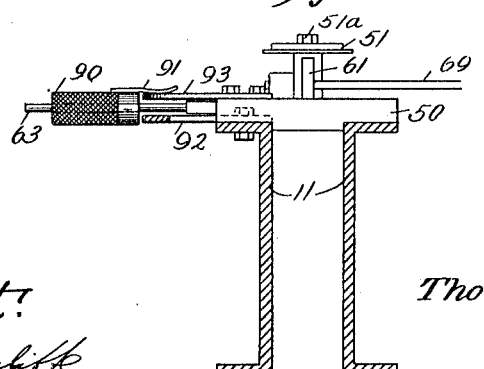
WITNESSES
INVENTOR
Thomas W. Roach
BY
ATTORNEYS

UNITED STATES PATENT OFFICE.

THOMAS WILEY ROACH, OF LYMAN, WASHINGTON.

SAW TENSIONING AND STRAIGHTENING MACHINE.

1,096,756.  Specification of Letters Patent.  Patented May 12, 1914.

Application filed June 18, 1913. Serial No. 774,360.

*To all whom it may concern:*

Be it known that I, THOMAS WILEY ROACH, a citizen of the United States, and a resident of Lyman, in the county of Skagit and State of Washington, have invented a new and Improved Saw Tensioning and Straightening Machine, of which the following is a full, clear, and exact description.

The present invention relates to a machine for operating on circular and other saws for performing the work known as rolling saws for tension, the machine being useful also for straightening a concave saw that has been forced over the saw collar.

The invention is more particularly designed as an improvement on the saw tensioning and straightening machine patented by me February 18, 1913, No. 1,053,746.

In my patented machine referred to, a support for the saw is provided on a saddle movable transversely on the saw carriage, the carriage being mounted to travel toward and from the rollers, for action on the saw. In the machine referred to, the arrangement is such that the rollers may be caused to take a circular course over the surface of the saw, or a spiral course, the rollers in the latter case automatically feeding the saw. The transverse movements of the saw support are governed by a hand lever, and my present invention provides a means for holding the said lever, and the saw support and saw controlled thereby in different positions to suit the particular nature of the work to be performed by the machine.

The invention will be particularly explained in the specific description following.

Reference is to be had to the accompanying drawings forming a part of this specification, in which similar characters of reference indicate corresponding parts in all the views.

Figure 1 is a detail plan view of a portion of a machine with my invention applied thereto; Fig. 2 is a similar view with the parts adjusted in different positions from those illustrated in Fig. 1; and Fig. 3 is a cross section on line 3—3 of Fig. 1.

In the form illustrated, frame members 11 having in practice suitable support, are provided, and tension rollers of approved form are mounted in the machine, one being indicated by the numeral 13, said roller being mounted on a shaft 15, having bearings in a block 19, which may be adjusted by any suitable means, a screw being indicated at 47. The mentioned parts may be of the form illustrated in my patent above referred to. Similarly the carriage 50 may be as shown in the said patent, and it has fitted thereon a transversely movable saddle 61. The member $61^a$ on the saddle has a saw support 51, which may be a disk on which the saw is mounted, the center of the disk being indicated at $51^a$. For moving the saddle transversely on the carriage 50 a bell crank lever 63 is fulcrumed as at 64, on the carriage 50, and the short angular arm 66 of said lever engages in a notch 67 of the saddle 61, so that by throwing the lever, the saddle may be moved to one side or the other of the center of the path of travel of the carriage, thus shifting the center of the saw represented by the center $51^a$ of the disk 51 to either side of the said center as described in my before-mentioned patent.

When it is not desired to have the rollers describe a spiral track on the saw, but to traverse a circular path, the lever 63 will be disposed at a normal angle to the line of travel, which will locate the center $51^a$ in the center of the path of travel of the carriage and in line with the bite of the tension rollers.

My present invention provides means whereby if the operator fails to dispose the lever at a normal angle to centrally position the center $51^a$, the operation of the rollers will automatically shift the saddle and bring the center to the proper position. For the described purpose, a sleeve 90 is provided on the lever 63, the sleeve being free to slide and to turn on the said lever, and projecting from the inner end of the sleeve is a spring arm 91 which is adapted to engage either a member 92 on a fixed portion of the machine, or a member 93 provided on the saddle 61. The member 92 is preferably in the form of an elongated bar having ends $92^a$ secured to the machine, as for instance to the adjacent frame member 11, so that said bar ranges parallel with the path of travel of the carriage. The member 93 on the saddle is preferably L-shaped, one arm being suitably secured to the saddle and the other ranging parallel with the member 92 and with the path of travel of the carriage, or approximately so.

With the described construction the sleeve 90 may be so disposed as to engage its spring arm 91 either with the fixed bar 92 or the arm 93, which is in fixed relation to the saddle, to move with the latter. Thus if it is desired to have the rollers traverse a spiral path, the lever is thrown to move the saddle and thus shift the center 51ª laterally, after which the spring arm 91 is engaged with the arm 93 carried by the saddle. If it is desired to have the rollers traverse a circular path, the spring arm 91 of the sleeve is engaged with the bar 92, as indicated in Fig. 2, thus engaging the lever disposed approximately at a normal angle to the path of travel of the carriage. Should, however, the lever be not at the exact normal angle and therefore fail to position the center 51ª at the center of the path of travel of the carriage, the spiral path traversed by the rollers will have a tendency to feed the carriage toward the rollers, but the slide 61 on the carriage is now held to a relatively fixed part 92, by engagement of the spring arm 91 therewith, and since the carriage cannot move forwardly, the action of the rollers will simply draw the saddle 61 inwardly, and force the carriage backward to shift the support 51, (dotted lines Fig. 2) from the position indicated in full lines, to the central position, indicated in dotted lines, the point of engagement of spring 91 with member 92 remaining constant, after which there will be no further tendency of the rollers to shift the saddle, the action of the rollers simply being to turn the saw on its axis, and to themselves describe a circular path, and there will be then no further automatic feed of the carriage.

It is to be understood that the spiral action of the rollers when the bar 92 is engaged by the sleeve 90, forces the carriage rearwardly, in moving the saddle inwardly, if the lever is not at the normal angle, the lever being held at its point of engagement with the fixed bar 92, and the sleeve 90 being free to move axially while held against movement longitudinally of the said bar; hence the resultant action is to restore the saw support 51 to the central position, as described. Thus the simple attachment serves either to hold the lever in an angular position so that the rollers will describe a spiral path on the saw and automatically feed the carriage and saw forwardly, or if desired, may be made to rectify any inaccuracy on the part of the operator in so positioning the saw center as to cause the rollers to describe a circular path.

The element 69 forms no part of the present invention, being in practice, as explained in my mentioned patent, formed to afford support for an edge portion of the saw.

Having thus described my invention, I claim as new, and desire to secure by Letters Patent:

1. In a machine of the character described, rolling means to operate on a saw, a saw carriage, means for supporting a saw while permitting it to rotate, means for adjusting the saw support transversely to the direction of travel of the carriage, and means traveling with the last-mentioned means to hold the same in adjusted position.

2. In a machine of the character described, rolling means to operate on a saw, a carriage mounted to travel toward said means, a saw supported on the carriage to support the saw and permit it to rotate, said saw support being movable transversely to the direction of travel of the carriage, means for shifting said support transversely, and means for engaging said last-mentioned means with a relatively fixed part of the machine.

3. In a machine of the character described, roller means for operating on the saw, a carriage mounted to travel toward and from said means, a transversely movable saw support on said carriage, a lever traveling with the carriage for shifting said support laterally from a central position, said lever when the support is in a central position being disposed at a normal angle to the direction of travel of the carriage, a relatively fixed member adjacent to the path of travel of the lever, and means for engaging the lever with the said relatively fixed member so that the action of the roller means will serve to restore the transversely movable support to the central position, if not centrally positioned by the lever.

4. In a machine of the character described employing rollers to operate on a saw, a carriage movable toward and from the roller means, a saw support mounted to move transversely on the carriage, means for shifting the support laterally from a central position on the carriage to cause the roller means to describe a spiral path and feed the saw and carriage forwardly, a holding device for the last mentioned means, and elements on the transversely movable saw support and on a fixed part of the machine respectively, either of which elements is adapted to be engaged by the said holding device.

5. In a machine of the character described employing roller means for operating on a saw, a carriage mounted to travel toward and from said roller means, a saw support on the carriage movable laterally to or from a central position, the rollers with the support in the central position operating in a circular path and operating in a spiral path when the support is shifted laterally from the central position, a lever fulcrumed on the carriage and engaging the saw support to shift the latter, a holding device on said lever, a member on the support, with which said holding device is adapted to engage, and a fixed member ranging along the path of travel of the first mentioned member and also adapted to be engaged by the holding device.

6. In a machine of the character described employing roller means for operating on a saw, a carriage mounted to travel toward and from said roller means, a saw support on the carriage adapted to move transversely of the carriage and to support a saw and permit it to rotate, a lever fulcrumed on the carriage and engaging said support, to shift the same laterally, a sleeve on the lever mounted to turn or to slide thereon, an arm on the sleeve, a member on the saw support with which said arm of the sleeve may be engaged to hold the lever in different angular positions, and a fixed member on the machine ranging along the path of travel of the lever and adapted to be engaged by the arm on the sleeve.

In testimony whereof I have signed my name to this specification in the presence of two subscribing witnesses.

THOMAS WILEY ROACH.

Witnesses:
ARTHUR LA DUKE,
SAMUEL A. ARNT.

---

Copies of this patent may be obtained for five cents each, by addressing the "Commissioner of Patents, Washington, D. C."